L. B. WHIPPLE.
LAST LATHE.
APPLICATION FILED APR. 24, 1919.

1,407,728.

Patented Feb. 28, 1922.
7 SHEETS—SHEET 1.

INVENTOR-
Leland B. Whipple
By his Attorney,
Nelson W. Howard

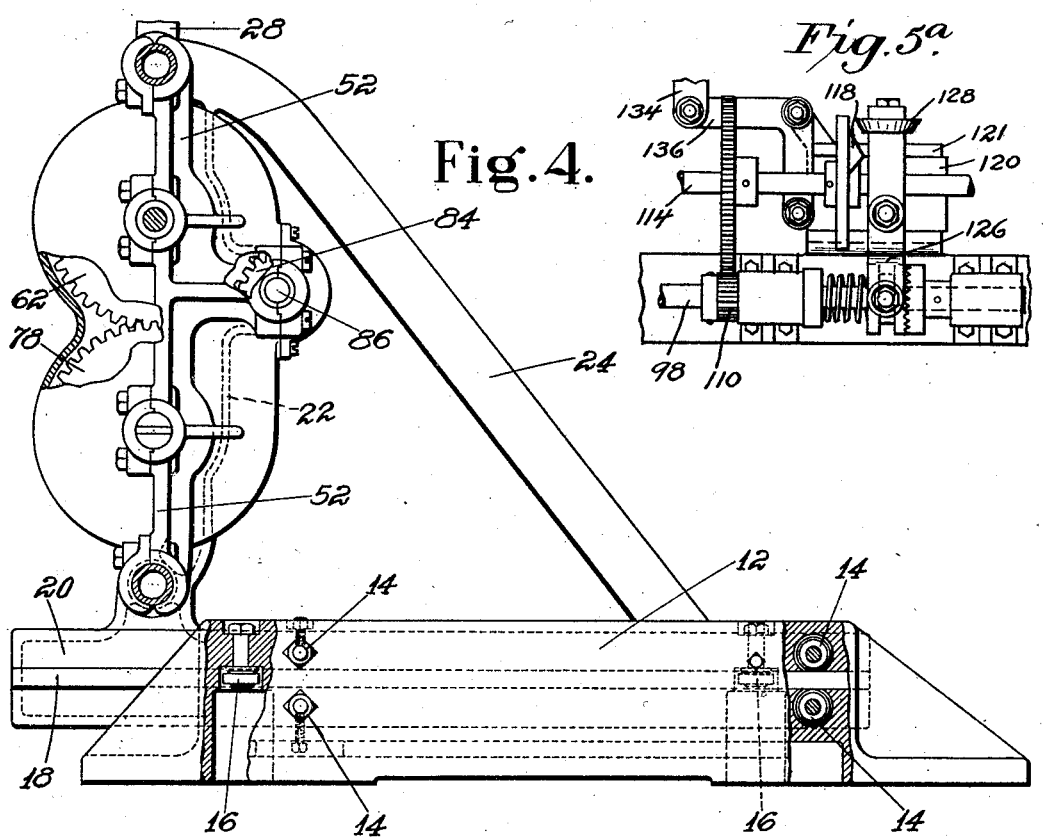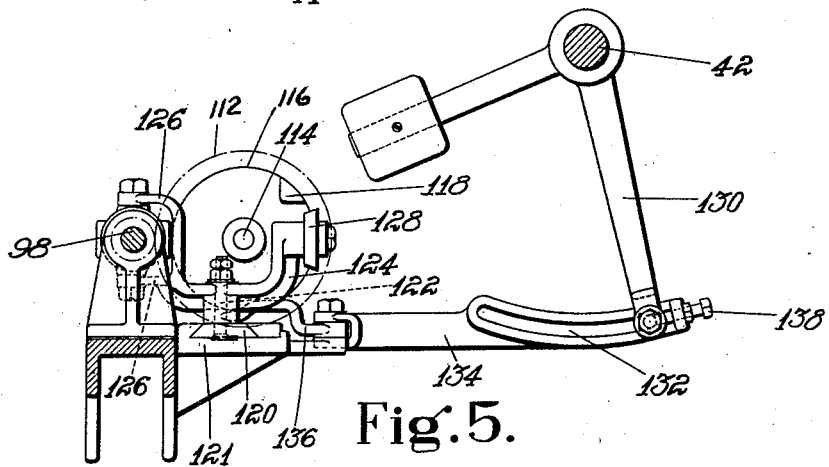

L. B. WHIPPLE.
LAST LATHE.
APPLICATION FILED APR. 24, 1919.
1,407,728.
Patented Feb. 28, 1922.
7 SHEETS—SHEET 5.
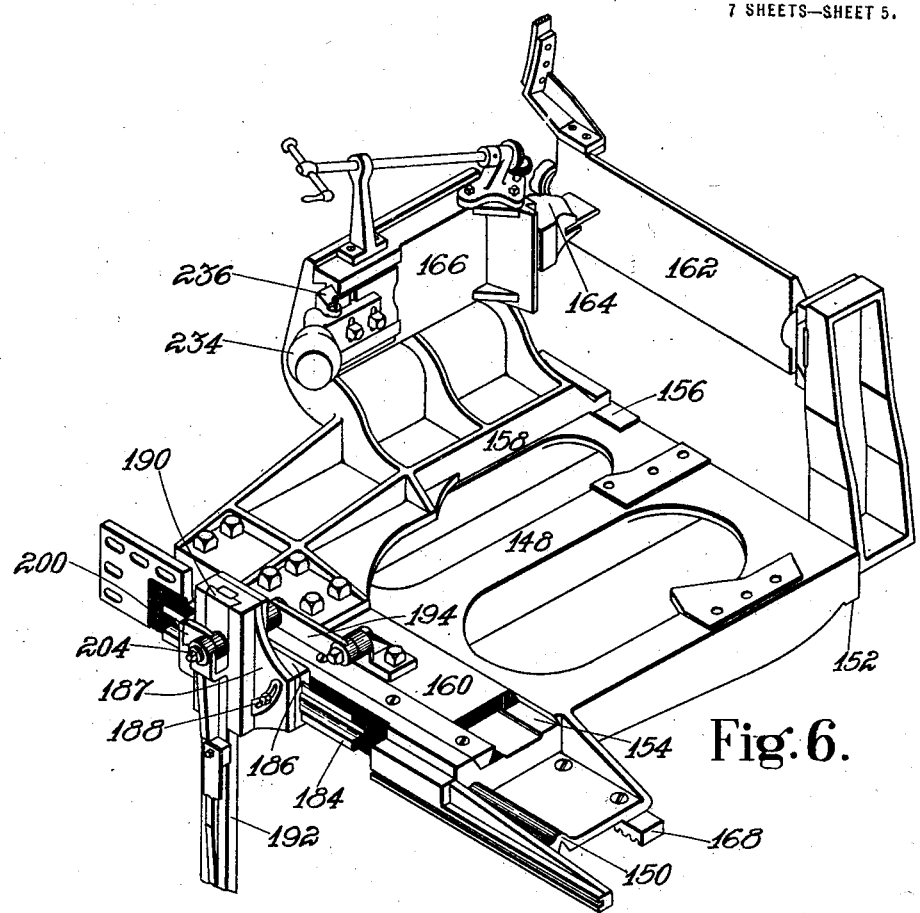
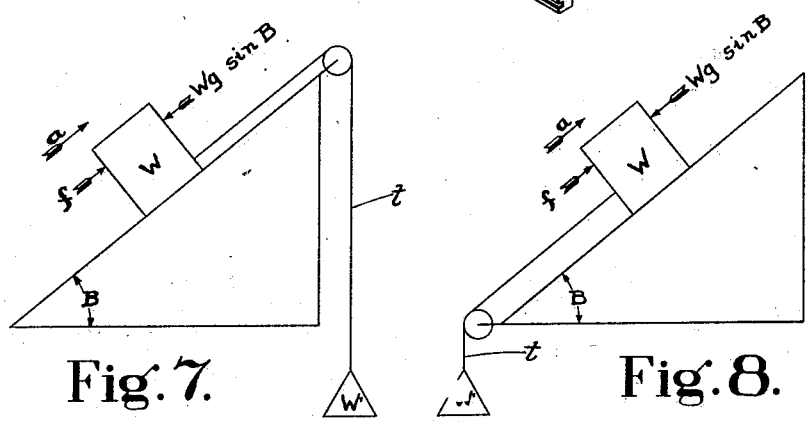
INVENTOR-
Leland B. Whipple
By his Attorney,
Nelson W. Howard

L. B. WHIPPLE.
LAST LATHE.
APPLICATION FILED APR. 24, 1919.

1,407,728.

Patented Feb. 28, 1922.
7 SHEETS—SHEET 6.

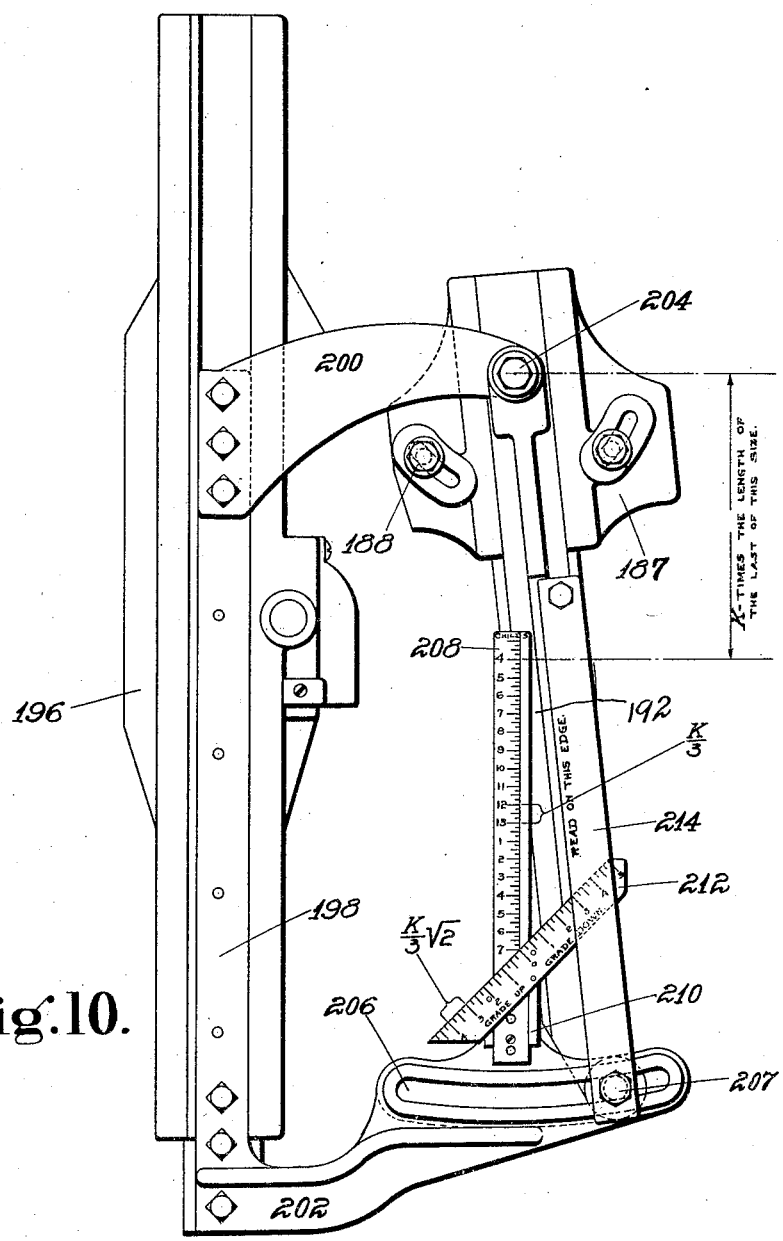

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

LAST LATHE.

1,407,728.   Specification of Letters Patent.   Patented Feb. 28, 1922.

Application filed April 24, 1919. Serial No. 292,281.

*To all whom it may concern:*

Be it known that I, LELAND B. WHIPPLE, a citizen of the United States, residing at Rochester, in the county of Monroe and State of New York, have invented certain Improvements in Last Lathes, of which the following description, in connection with the accompanying drawings, is a specification, like reference characters on the drawings indicating like parts in the several figures.

This invention relates to machines for producing articles having a systematic resemblance to a pattern and is herein disclosed as embodied in a last lathe. It should be understood, however, that the invention, especially in some aspects, is not limited to this particular type of copying machines, or indeed, to machines for producing solid objects.

Prior to the advent of machines developed in connection with the present invention, shoe lasts have been cut in last lathes having a swinging frame with provision for cutting one last at a time. It had long been recognized that a machine which would cut two lasts at once would cut down by nearly 50% the floor space and time necessary to produce a given output of lasts, and machines for cutting two or even more lasts at once have been proposed, but until the machines of the present invention and that of Frank S. Buck, application Ser. No. 292,280, were developed, none had ever been even built, as none of the proposed forms gave sufficient promise of securing the meticulous accuracy required in last cutting. A last which is inaccurate by as much as $\frac{1}{32}$ inch in a dimension is rejected, and any substantial number of errors as large as $\frac{1}{64}$ inch will cause the rejection of a whole order of lasts.

Much of the inaccuracy occurring in last cutting is due, among other causes, to vibration and jar, and to lack of stiffness in the parts. The movement of the oscillating frame which carries the model and block is governed by the model wheel, the pressure from which has to stop and reverse the direction of the movement each time the model and blocks revolve. This jars the machine and causes the cutters to cut inaccurately in the block. Any lack of stiffness in the swing frame will have a similar result. The making of the parts abundantly stiff to eliminate the bending difficulty increased the weight so much as to make the jar prohibitive, and the prior machines merely struck a balance between these two conflicting requirements.

The heavy cutter head used on last lathes prior to the invention described in Patent No. 1,137,117 to F. S. Buck was another source of trouble. This old cutter head was ten inches in diameter, and consisted of a heavy base on which were mounted several hook-shaped cutters. When run at high speed, such an organization is practically impossible to balance dynamically, since it is not symmetrical with regard to any axis, the different roughing cutters and the finishing cutters being of different sizes and shapes. Such a construction in itself gives rise to much vibration.

The problem of the "double lathe" seems at first sight a simple one, and many solutions have been suggested, none of which, however, has ever promised sufficient practical possibilities to warrant embodiment of it in an actual machine.

The invention of Buck (Patent No. 1,137,117) is largely responsible for the diminution in mass by which I have been able to produce a double lathe which will not be subject to objectionable vibration. I have been enabled to mount two last blocks in a slide frame at a distance of $7\frac{1}{2}$ inches on centers. The compactness thereby secured reduces the mass of the slide frame so materially as compared with the mass which would be required in constructing a double lathe with the old 10 inch cutter head, as to make possible a machine which was impossible as a commercial proposition before. It should be emphasized in this connection that two cutter heads, one for each block, are absolutely indispensable to a double machine. A single cutter head, operating upon two blocks, must be located between them, in which case the direction of shear is at an angle to the directions of relative approach and separation of the cutter and blocks. The cutter will therefore tend to drag one of the blocks toward it, and a continued "hogging" and springing back will result. This will roughen the block in question, and gives rise to vibration which will affect the entire machine.

I have advantageously combined the two cutter heads, the axes of which, and the axes of the corresponding blocks, lie in the plane of relative approach and separation of the axes, with an opposite drive for the cutters. Each cutter is thus enabled to rotate in a direction opposite to that of the block it treats, thus securing the advantage of feeding each block against the cut in a plane perpendicular to the direction of shear. This combination is an important feature of the invention.

Another important feature of the invention is the arrangement of the guideways for the slide frame at an angle to the horizontal. It is necessary to eliminate every unnecessary pound of mass from the oscillating parts in order to avoid jar as the low places in the model fall over the model wheel and then are forced backward by the revolution of the model. It has been the practice to hold the swing frame against the cutters and model wheel by a counterweight which adds to the mass whose motion has to be reversed. I have provided a downwardly sloping slide so that the force of gravity is used in holding the slide frame "down to its work" but, of course, without the increase of mass which is necessary when a counterweight sufficient to accomplish the same result is used. I regard the use of a downwardly sloping slide frame guide as an important feature of my invention.

Another important feature of the invention is comprised in a novel grading mechanism. The inventions of Frank S. Buck, Patent No. 1,302,303, granted April 29, 1919, and application Ser. No. 292,280 filed April 24, 1919, have secured mathematical accuracy in length grading of lasts, a thing heretofore unknown in the art. I have improved the Buck mechanism to provide for easy and convenient setting to produce any desired grade by making the adjustment pivot of the grade slide bar co-axial with the connection to the carriages so that the swinging of the grade bar does not affect the distance between the carriages. This construction makes close setting possible without requiring any great exertion on the part of the operator.

These and other features of the invention, comprising various arrangements and combination of parts will be understood from the following description of a preferred embodiment thereof, selected for purposes of illustration, and shown in the accompanying drawings in which Fig. 1 is a front elevation of the essential parts of the machine;

Fig. 4 is an end elevation of the slide frame;

Fig. 5 is a detail of the drive;

Fig. 5ª is a plan of the mechanism shown in Fig. 5.

Figure 9:
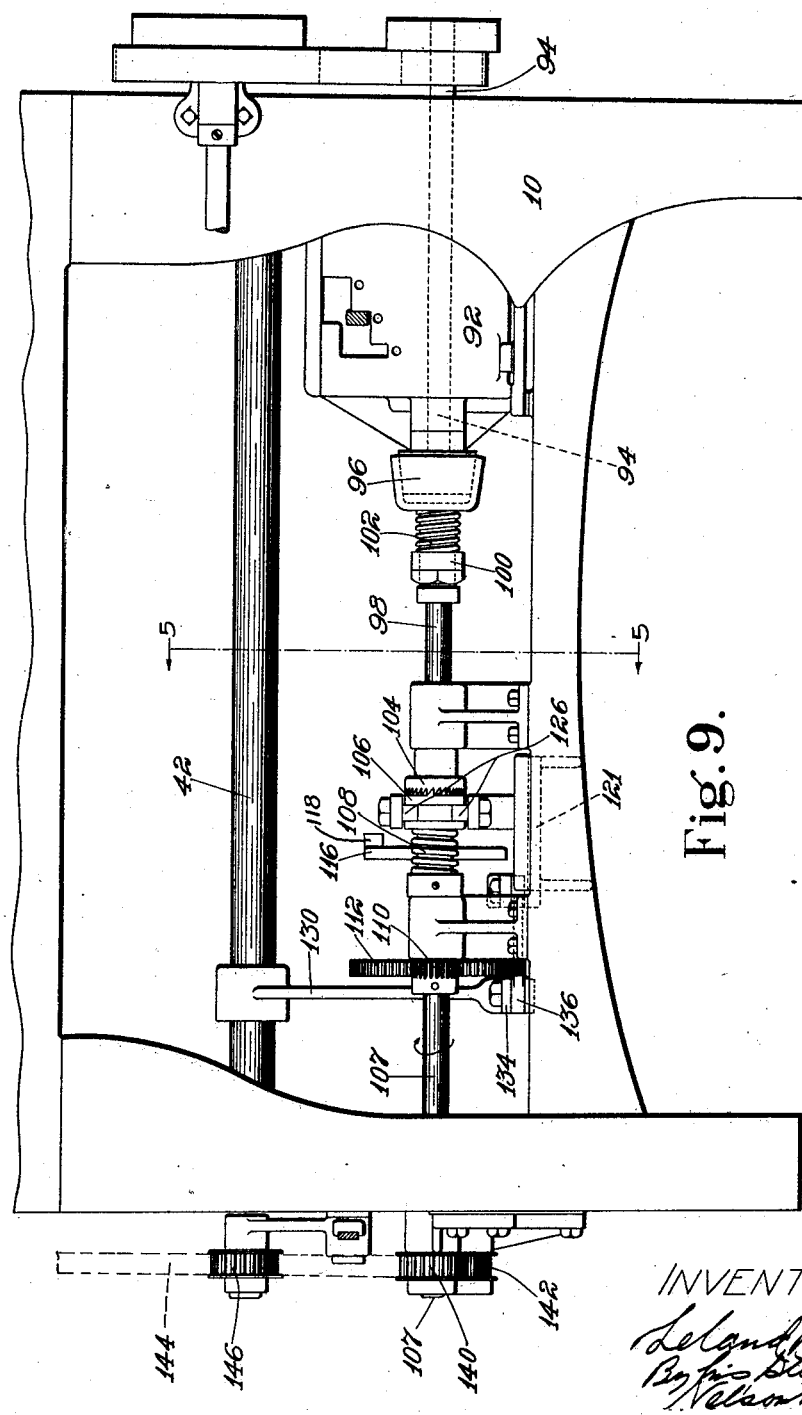

Fig. 6 is a perspective view of the carriages;

Figs. 7 and 8 are diagrammatic views of the slide frame;

Fig. 9 is a detail of the drive mechanism, and

Fig. 10 is a detail of the length grading mechanism.

The main frame 10 is provided at its top with two guides 12 which are parallel and extend and slope downwardly from front to rear. These guides each comprise two sets of vertically acting roller bearings 14 and two laterally acting roller bearings 16, one set of each near each end of the guide. These bearings co-act with ribs 18 on the lower frame members of the slide frame, which will be now described. The relation between the main frame and the slide frame may be otherwise contrived, but the form shown is a good practical one. The rollers are outside the range of movement of the slide frame when cutting a last, so that the frame is always firmly supported.

The slide frame is formed of two bars 20 which carry the ribs 18. Mounted integrally on the bars are the verticals 22, which are braced to the bars 20 by diagonals 24. The members 20, 22 and 24 at each end are preferably cast in one piece to make the end frame of the slide frame. These end frames are joined by two bars 26 near the top and bottom, respectively. The left hand member 22 is shown with an extension 28 carrying a roller 30 which runs in a guide 32 at the upper end of an arm 34 which is firmly fastened to the main frame. The guide 32 is bilateral so that it supports the slide frame against distortion in the plane of the bars 26. Suitable dust guards, preferably of felt, are mounted at 36, between the slide frame and the guides 20.

Owing to the inclination of the guides 20 the slide frame has always a tendency to slide downwardly toward the rear of the machine. It is held in its extreme forward position, when desired, for the purpose of inserting the work, for example, by a suitable latch 38, operated by a handle 40. A rockshaft 42 is mounted in the main frame and carries two crank arms 44 extending upwardly toward the slide frame. The upper ends of these crank arms are linked by links 46 to the bars 20, respectively. The slide frame is thus preserved against distortion in the plane of the bars 20. The shaft 42 has a third crank arm 48 which carries a counterweight 50. This arm can be arranged either before or behind the shaft 42, so that the counterweight will tend to impel the slide frame either up or down the inclined way 12. Preferably, the incline should be such that the downward tendency of the slide frame under the influence of gravity will produce the maximum pressure required between the model wheel and model, in order that the counterweight may be eliminated. The elimination, or at least, the diminution of the counterweight, diminishes by so much the mass which has to be continually suddenly reversed in movement during the cutting and obviates to that extent the jar on the machine. This reversal of movement is produced by the action of the model wheel on the model at a heavy mechanical disadvantage, and much of the roughness in last cutting results from the vibration thus produced. The adjustable arm and counterweight permit the modification of the gravitational effect in any desired manner.

It should be noted that the effect of the counterweights in increasing the mass and inertia of the system is not due to the rigidity of the connection between them. It is immaterial whether the counterweight is hung on a cord or a lever. The mass-acceleration change which jars the machine is due to the entire mass whose movement is reversed, independent of the changing tension in the cord.

Fig. 8 shows diagrammatically the situation where the slope is not steep enough to produce the desired reaction between the model wheel and model. Let W and W' be the mass of the slide frame and counterweight in pounds, and let $f$, reckoned positively away from the model wheel toward the slide frame, be the force in pounds exerted by the model wheel and cutters on the slide frame. Let $a$ be the acceleration, measured positively up the slope, of the slide frame. Let $t$ be the tension in pounds in the counterweight cord. Let $g$ be the acceleration of gravity. $a$ is determined absolutely by the shape of the model and its velocity of rotation, and the minimum allowable value of $f$ which will maintain steady contact is known from experience.

Regarding W and W' as free bodies moving under the effect of the forces impressed upon them, we know of each that the product of its mass and acceleration is equal to the algebraic sum of the forces acting upon it. The force in pounds due to gravity tending to slide the frame down the slope is W sin B. Then $$-Wa = -fg + Wg \sin B + gt \quad (1)$$
$$-W'a = W'g - gt \quad (2)$$

Eliminating the variable $t$ we have $$f = (W + W')\frac{a}{g} + W' + W \sin B \quad (3)$$

W' will be the maximum value which is necessary to produce the required $f$ as $a$ runs through its cycle. The first term after the equality sign shows that the jar is produced by the sum of W and W' multiplied by any change in acceleration. If sin B be made large enough W' can be made zero.

If the counterweight be used to pull the frame up the slope, (see Fig. 7), we have $$-Wa = -fg + Wg \sin B - gt \quad (4)$$
$$-W'a = -W'g + gt \quad (5)$$

whence $$f = (W + W')\frac{a}{g} - W' + W \sin B \quad (6)$$

where we reach the same results as before. Here, we can dispense with W' if we take B small enough. The ideal condition is therefore that the slope should be such as to produce (by its Wg sin B) just the effect required to eliminate the counterweight W'. This condition can only be approximated, because of the varying conditions of work from one end of a model to the other, and upon different models, so a counterweight has been supplied to add or subtract from the force Wg sin B poundals.

Mounted on the bars 26 are the head stock frames 52, 54, and the adjustable tail stock frames 56, 58. A shaft 60 extends between the frames 52 and 54, and has gears 62, 64 near its ends. At its inner end is mounted the block driving dog 66. A stub shaft 68 is mounted in the frame 54 below the shaft. This carries a gear 70 meshing with the gear 64, and a second block driving dog 72. The frame 58 carries two corresponding block dead centers 74 of ordinary construction. The frame 52 carries a stub shaft 76, on which are mounted the gears 78 meshing with the gear 62 and the model driving dog 80. The frame 56 carries the model dead center 82 of ordinary construction. The model and blocks are driven by a gear 84, which meshes with the gear 62 and is mounted on a stub shaft 86 mounted in the frame 22, and carrying a sprocket 88 on its outer end. The gears 62, 78, 64, 70 are all of the same size so that actuation of the sprocket 88 will drive the model and lower block in one direction and the upper block in the other direction at the same speed.

The driving mechanism will now be described. A motor 90 is directly connected to a change gear box 92 which transmits the motion to a shaft 94, connected by a cone friction clutch 96 with a shaft 98. The cone clutch may be adjusted by the nuts 100, working against the spring 102. The shaft 98 carries fixedly mounted thereon the toothed clutch member 104 which co-operates with a second toothed clutch member 106 normally held in engagement with the clutch member 104 by a spring 108 and splined on a shaft 107 co-axial with the shaft 98. The shaft 98 carries a gear 110 which drives a gear 112 on a shaft 114, which carries also a disk 116 having a cam projection 118 on its face. A slide 120 in a bracket 121 carries a stud 122 on which is mounted a lever 124 having a fork 126 at one end to control the splined clutch member 106, and a cam roller 128 at the other. The parts are so proportioned that the disk 116 normally revolves without engagement between the cam 118 and roller 128, but if the slide 120 is moved to the left in Fig. 9 or away from the reader in Fig. 5 and held there, the cam 118 will move the lever 124 and disconnect the members 104 and 106 whereupon the shaft 107 will stop.

The shaft 42 has a fourth crank arm 130 the end of which works during the last cutting in an arcuate slot 132 in a bar 134 the forward end of which is pivoted to one end of a bell crank lever 136 pivoted on the bracket 121, the other arm of which is pivoted on the slide 120. When the slide frame is pulled out to latching position, the shaft 42 is rotated, carrying the arm 130 back against the adjustable stop 138 in the slot 132, and pulling back the bar 134. This operates the bell-crank and throws the slide 120, so that the shaft 107 will stop when the cam 118 reaches the roll 128.

The shaft 107 has at its outer end a sprocket wheel 140, around which a sprocket wheel 142 and the sprocket wheel 88 runs a chain 144, kept taut by a tightener 146. The gearing is so proportioned that the shaft 107 rotates an integral number of times while the gear 78 rotates once, so that the model and work driving dogs will always be stopped in the same position, which will facilitate the insertion and removal of the model and blocks.

The cutter carriage 148 is formed with V and flat guides 150 and 152 arranged to engage a rib and a flat on the main frame, as is usual in machines of this class. The carriage has on its upper surface a dovetail guide 154 and a flat guide 156. The model wheel carriage 158 slides on the guide 156 and has an extension 160 which runs in the guide 154. The width grading mechanism, comprising the fan board 162, adjustable feeler 164, and slide 166 is of ordinary construction.

Figure 1:
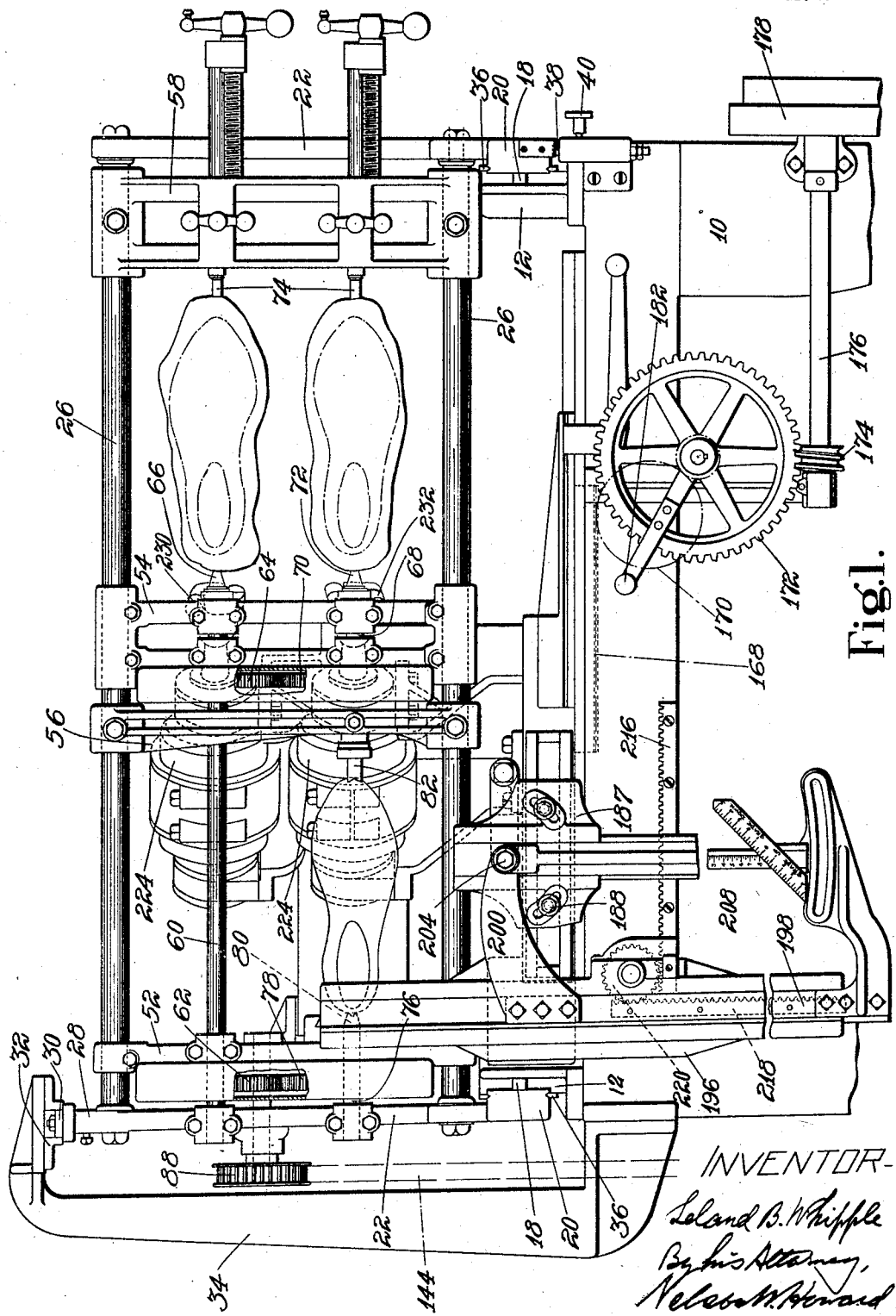
Figure 2:
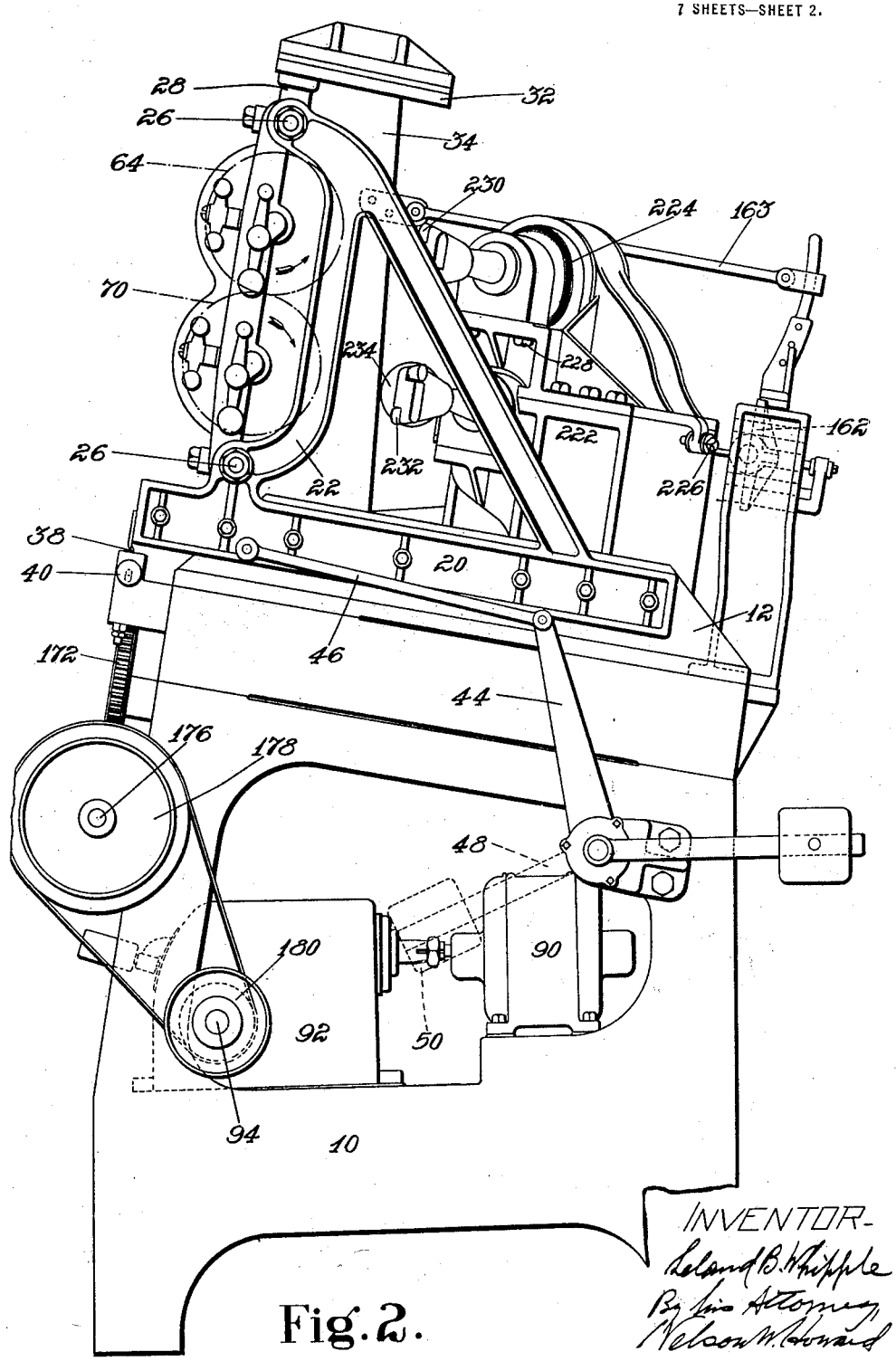
Figs. 2 and 3 are end elevations.
Figure 3:
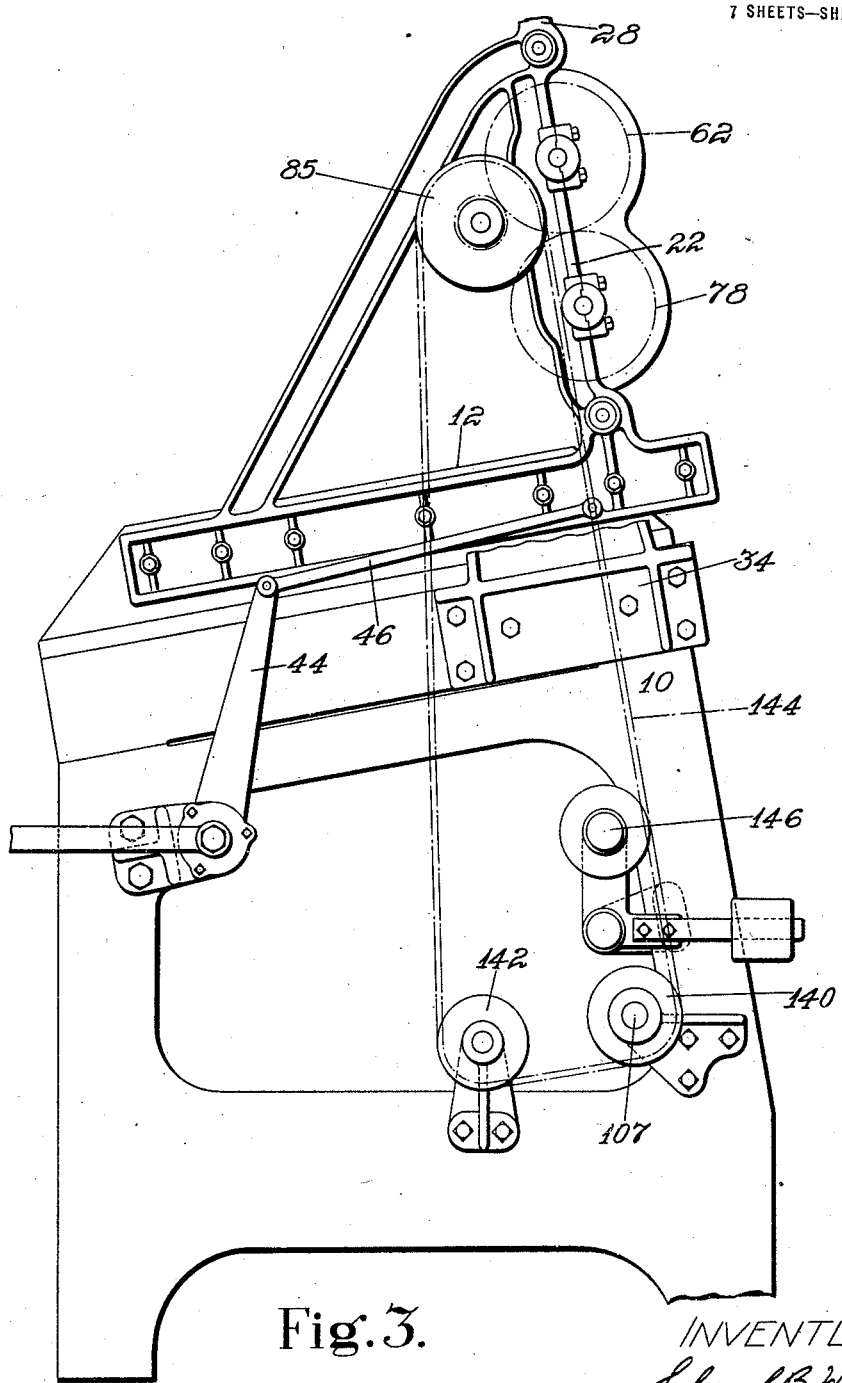

The cutter carriage has on its lower face a rack 168 driven by a pinion gearing 170, 172. The wheel 172 is driven by the worm 174 on a shaft 176 having a cone pulley 178 driven from a cone pulley 180 on the shaft 94. The shaft 176 is raised and lowered in the ordinary manner to engage and disengage the worm 174, with the wheel 172, and is automatically dropped when the cutter carriage has moved to its left most extremity of movement (Fig. 1). This mechanism is well-known to users of the Gilman lathes and need not be further described. The handle 182 is used to rack the cutter carriage back and forth rapidly when the gearing 172, 174 is disconnected.

The cutter carriage carries a dovetail 184 on which works a slide 186. Pivoted on this slide is a block 187, which can be angularly adjusted about the pivot by the bolts and segmental slots 188. The block 187 has a dovetail guide 190 in which works a grade bar 192. The block 186 is joined to the model wheel carriage by a link 194. Fixedly mounted on the cutter carriage is a dovetail guide 196 in which works a vertical bar 198 carrying two arms 200 and 202 extending toward the grade bar. The arm 200 is pivoted to the grade bar at 204 and the arm 202 has an arcuate slot 206 about 204 as center in which the lower end of the grade bar can be adjustably secured by a bolt 207. The arm 202 carries a scale 208 the reading edge of which is parallel to the bar 198 and is collinear with the center 204. The scale 208 is arranged to carry an adjustable slide 210 which carries a scale 212 at an angle of 45° with the scale 208 and with its zero point always on the reading edge of the scale 208 whatever its adjusted position. The grade bar 192 carries a blade 214 whose reading edge is parallel to the grade bar and is collinear with the center 204.

A horizontal rack 216 is mounted on the main frame, and a second rack 218 is mounted on the vertical bar 198. A pinion 220, mounted on the guide 196 connects these two racks. As the cutter carriage is driven to the left in Fig. 1 the bar 198 will be lowered vertically at the same velocity, while being carried horizontally by the carriage. If the grade bar 192 has been set in non-parallelism with the vertical bar the vertical movement of the system will cause the slide 186 to move relatively toward or from the guide 196 by an amount equal to the product of the travel of the bar 196 and the tangent of the angle of adjustment of the grade bar measured from the mean position at the reading edge of the scale 208. This relative movement of the slide and the guide 196 will, through the link 194, move the model wheel carriage on the cutter carriage by the same amount, and thereby accomplish a length grading action on the last being out. The relative travel of the two carriages per inch travel of the cutter carriage is equal to the offset or departure of the grade bar from its mean position per inch measured along the mean position.

The grading mechanism may be otherwise contrived, but the form shown is strong, practical and smoothly working, and has performed satisfactorily in practice. If the guide 196 were mounted on the model wheel carriage the offset of the grade bar per inch would equal the relative travel of the carriages per inch travel of the model wheel carriage. The system 198, 192, 200, 202, is a rigid one, when once adjusted, and acts as a wedge between the two carriages, the term "wedge" being used herein in the sense of two relatively inclined planes used either to separate or to bring together the objects engaging them respectively. It is obvious that the grading action will be absolutely uniform. The fact that the wedge forms part of the connection between the carriages and moves transversely to their line of travel enables all lost motion in the connections to be taken up in the first 0.01 inch of cutting, so that any irregularity due to mechanical imperfections of adjustment will disappear while the stub at the end of the list is being cut, and the last itself will be graded perfectly. Any discrepancy in the relative movement of the carriages will be so small as to be negligible, as the backlash in the slide will be much less than 0.01 inch.

An important feature of the machine resides in the mechanism for setting the grade bar. The absolute amount by which any grading device is to be set depends upon the absolute size of the model used, since the grading of (for instance) $\frac{1}{3}$ inch in length per size requires different magnification ratios corresponding to different model lengths. In the ordinary Gilman and in the Kimball Bros. & Sprague lathes the length of the grading lever is changed by moving its pivot vertically, so that the same grading scale can be used for models of different lengths. The adjustments are difficult to make, and more or less "jockeying" is always necessary when a new model is placed in the machine. All such difficulties have been avoided by the novel setting mechanism provided in this machine.

The scale 208 is graduated in units of size measurement according to the ordinary system in use in this country, but is calibrated in units $1\frac{1}{2}$ times as large. That is, the distance between the 6 and 7 marks is $\frac{1}{2}$ inch instead of $\frac{1}{3}$ inch. The scale 212 is graduated in units of ordinary length grade, up and down, and is calibrated in units of $\frac{1}{2}\sqrt{2}$ inches. The scale 208 is so located vertically that the distances from the pivot 204 to its graduation marks are all $1\frac{1}{2}$ times the actual or "stick" lengths of the lasts corresponding to the graduations. That is, the #4 child's last is 5.271 inches long and the distance from the pivot 204 to the corresponding graduation mark is 7.906 inches. Any other multiplier K, would do, provided only that the apparatus is large enough to permit satisfactory operation. In other words, it is the angle and not the length of the wedge which effects the desired result.

Suppose it is desired to grade down 3 sizes from a 7 men's model. The scale 212 is moved up so that its zero mark coincides with the 7 men's mark on scale 208 and the bar 192 is swung to the right so that the reading edge of the plate 214 is over the 3 mark on scale 212. Now this 3 mark is exactly vertically opposite the 4 mark on scale 208 owing to the $\sqrt{2}$ factor used in the graduation of scale 212, and the 45° angle on which it is set. Furthermore, this 3 mark is offset to the left of the 4 mark by exactly 1.5 inches, or 3 sizes as measured on the scale 208, owing to the same reasons. Therefore, while the cutter carriage (and the wedge system vertically) travels the length of a #4 (i.e. $\frac{3}{4}$ of the distance from the point 204 to the 4 mark of scale 208) the model wheel carriage will be relatively pulled forward by an amount equal to $\frac{3}{4}$ of the distance between the 3 mark on scale 212 and the 4 mark on scale 208, or 1 inch. In other words, the model wheel carriage will travel the length of a 7 while the cutter carriage travels the length of a 4, which is the result desired. The "7 men's model" spoken of above is a last which measures 7 on the last measuring stick. A 7 model will ordinarily measure more than 7 on the stick, due to the pointed toe, but will have the #7 foot room in it and will be marked 7. The actual "stick length" of the model will always be used in setting the scale 212, no attention being paid to its marked length.

Thus the single graduation scale suffices to set the grade bar for any model. Its setting to the model length is simple, and as no stress comes upon it, no bolts have to be loosened and tightened. The system is simple, and the setting of the scale 212 can be read by putting the model on the last measuring stick. If the vertical movement of the wedge were governed by the model wheel carriage, the scale 212 would be at right angles to the scale 208 and the $\sqrt{2}$ factor would be omitted in its calibration. Its adjustment and use would be the same.

The length grader setting scale above described is the invention of Stanley E. Boynton, and is claimed in his application Ser. No. 426,125, filed Nov. 24, 1920.

The axis of the guide bar passes through the pivot between the block 187 and the slide 186. The automatic stop mechanism is preferably arranged to bring the pivot 204 in line with this pivot at the instant of stop. The grade bar can then be swung to a new adjusted position without moving the slide 184, whereas if adjustment be made when the two pivots are vertically separated, the angular movement of the bar will cause a movement of the slide 186, and consequently of the model carriage.

The cutter carriage carries a frame 222 in which are mounted the stators of two motors 224. Suitable provision is made for relative horizontal and angular adjustment of their axes, as for example, by the screws 226, 228. The axes of the stators lie in planes parallel to the plane of the guides 12, and passing through the axes of the block holding means, and are placed at an angle of about 30° with these axes respectively. The motor rotors have "small" cutter heads 230, 232, of approximately 3½ inches diameter. This is approximately the diameter of a men's model last, which is size 7–C, and is about 9 inches in perimeter at the instep. The model wheel 234 is vertically adjustably mounted on a slide 236 which is adjustable in the slide 166. Its axis is similarly situated with relation to the axis of the model holding means. It has been found advantageous to run the motors on 120 cycle current, which can be obtained through a frequency changer obtainable from the General Electric Company, and the rotors will then revolve it about 7200 R. P. M. The direct motor drive eliminates all vibration due to belt trouble. The double cutter construction is an exceedingly important feature of the invention. Each cutter is so located that its point of contact with the block is in the plane of movement of the block axis, as the slide frame moves back and forth. This insures that the direction of cut is perpendicular to this plane and all tendency to drag the work into the cutter with its consequent digging and vibration, which would give rise to serious difficulty if it were attempted to use a single cutter between the blocks is avoided. These cutter heads revolve oppositely to the blocks they respectively engage. The rotational feed of the blocks is therefore likewise opposite the direction of cut, so that any vibration due to backlash in the gears is avoided.

The practical success of the machine is also due largely to the compactness secured by the "small cutter head" construction. In the machine just described, the distance between block centers is about 7½ inches. This compactness reduces the weight of the oscillating parts, with the consequent elimination of the vibration and jar due to the sudden reversal of movement of a larger mass. The distance mentioned is as close as two rough last blocks can be conveniently hung to rotate past each other and permit the necessary handling. It would of course be impossible to work two of the old ten-inch cutters so close together.

Having described my invention, what I claim as new and desire to secure by Letters Patent of the United States is:

1. In a machine of the class described, a traversing carriage having a standard, two cutter heads one above the other, mounted in the standard, a slide frame carrying two block holding and rotating means similarly arranged opposite the cutter heads, the cutter heads having a diameter approximately equal to that of a men's model and being arranged to expose one end, model holding and rotating means on the slide frame and a model wheel in relation thereto corresponding with the relation of the cutter heads to the block holding means, the axes of the cutters being separated by approximately twice the diameter of the cutter heads, and a rectilinear slideway for the slide frame perpendicular to the plane of the two block holding means.

2. In a machine of the class described, a slide frame, two block holding the rotating means mounted one above the other in the slide frame, and geared for equal rotation in opposite directions, a model holding and rotating means mounted in the slide frame co-axially with one of the block holding means, two cutter heads, each having an exposed end and constructed to operate on the work with the exposed end, mounted in similar relations to the block holding means, and a model wheel arranged in similar relation to the model holding means to control the relation of the cutter heads to blocks carried on the block holding means.

3. In a machine of the class described, a slide frame, two block holding and rotating means mounted one above the other in the slide frame, and geared for equal rotation in opposite directions, a model holding and rotating means mounted in the slide frame co-axially with one of the block holding means, two cutter heads mounted in similar relation to the block holding means and arranged with an end of each exposed, said cutter heads having a diameter approximately equal to that of a men's model, and having their axes spaced apart not more than a distance approximately equal to twice their diameter, and a model wheel arranged in like relation to the model holding means to control the relation of the cutter heads to blocks carried on the block holding means.

4. In a machine of the class described, a slide frame comprising a base member and an upright member, said upright member having provision for supporting and rotating a model and two blocks, a rectilinear guide means for the base member, bracing means between the base and upright members, and a bilateral rectilinear guide for the upper end of the upright member constructed and arranged to prevent lateral horizontal distortion of the upright member.

5. In a machine of the class described, a model carriage and a model wheel carriage, a slide upon which one carriage is mounted for movement toward and from the other carriage, the slide being at an acute angle to the horizontal in the direction of movement whereby gravity is utilized in producing the movement.

6. In a machine of the class described, model holding and model contacting means, block holding and block treating means, two carriages, each carrying one means of each pair, means for driving a carriage, two transverse guides, one connected to each carriage, one of said guides being adjustable to swing its axis in a plane parallel to the direction of carriage drive, a slide bar in each guide, said bars being pivoted together at a point lying in a line passing through the axis of the guide adjustment and parallel to the slide bar working in the adjustable guide, whereby the angle between the slide bars can be adjusted without altering the distance between the carriages.

7. In a machine of the class described, model holding and model contacting means, block holding and block treating means, two carriages, each carrying one means of each pair, means for driving a carriage, two transverse guides, one connected to each carriage, one of said guides being adjustable to swing its axis in a plane parallel to the direction of carriage drive, a slide bar in each guide, said bars being pivoted together at a point lying in a line passing through the axis of the guide adjustment and parallel to the slide bar working in the adjustable guide, whereby the angle between the slide bars can be adjusted without altering the distance between the carriages, and means for driving the slide bars in the slides during the last cutting constructed and arranged to bring the pivot of the bars into the axis of the guide adjustment when the machine is at one extremity of its cycle of movement.

In testimony whereof I have signed my name to this specification.

LELAND B. WHIPPLE.

Certificate of Correction.

It is hereby certified that in Letters Patent No. 1,407,728, granted February 28, 1922, upon the application of Leland B. Whipple, of Rochester, New York, for an improvement in "Last Lathes," errors appear in the printed specification requiring correction as follows: Page 4, line 113, for the word " out " read *cut;* page 6, line 75, claim 2, for the article " the " read *and;* and that the said Letters Patent should be read with these corrections therein that the same may conform to the record of the case in the Patent Office.

Signed and sealed this 19th day of September, A. D., 1922.

[SEAL.]
WM. A. KINNAN,
*Acting Commissioner of Patents.*